Feb. 2, 1954  A. C. ROWLEY  2,667,934
DRY PIPE VALVE
Filed Dec. 28, 1951  4 Sheets-Sheet 1

Inventor:
Arthur C. Rowley
by his Attorneys
Howson & Howson

Feb. 2, 1954

A. C. ROWLEY 2,667,934

DRY PIPE VALVE

Filed Dec. 28, 1951

Inventor:
Arthur C. Rowley
by his Attorneys
Howson & Howson

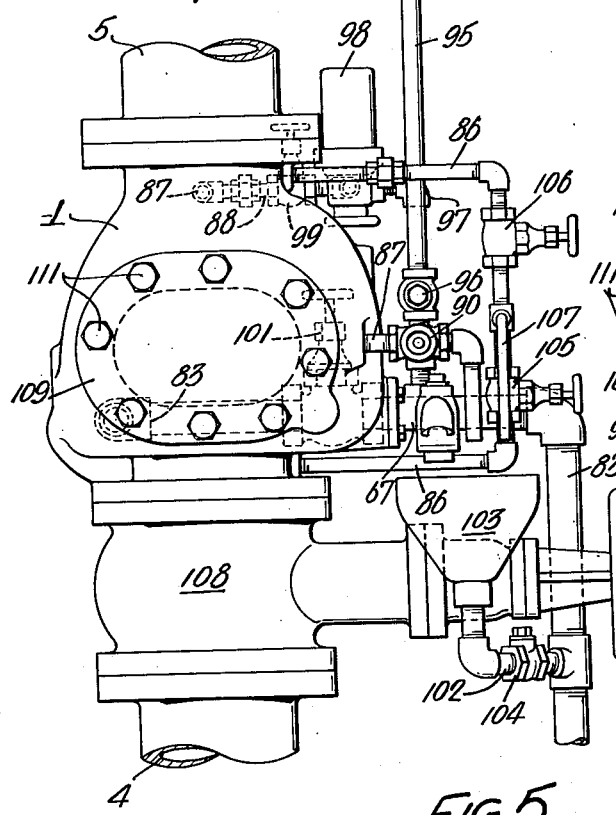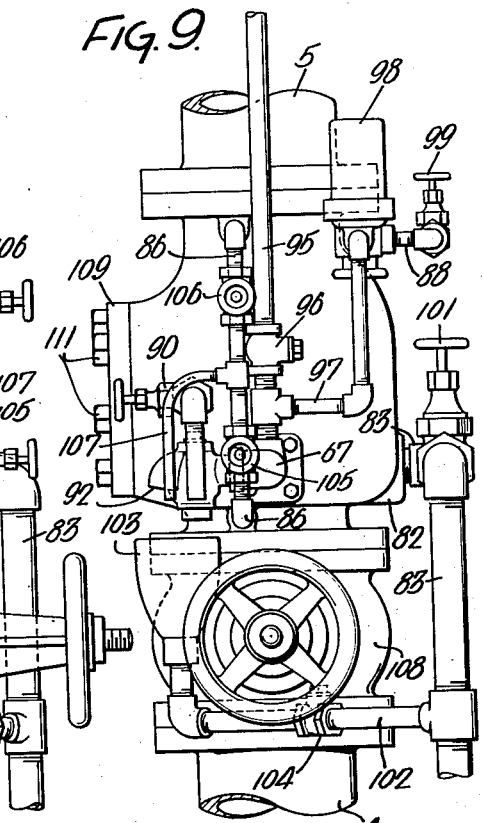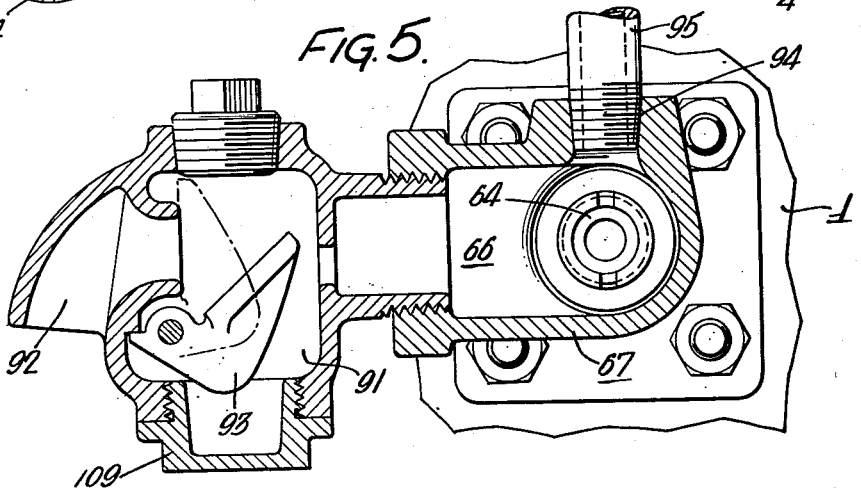

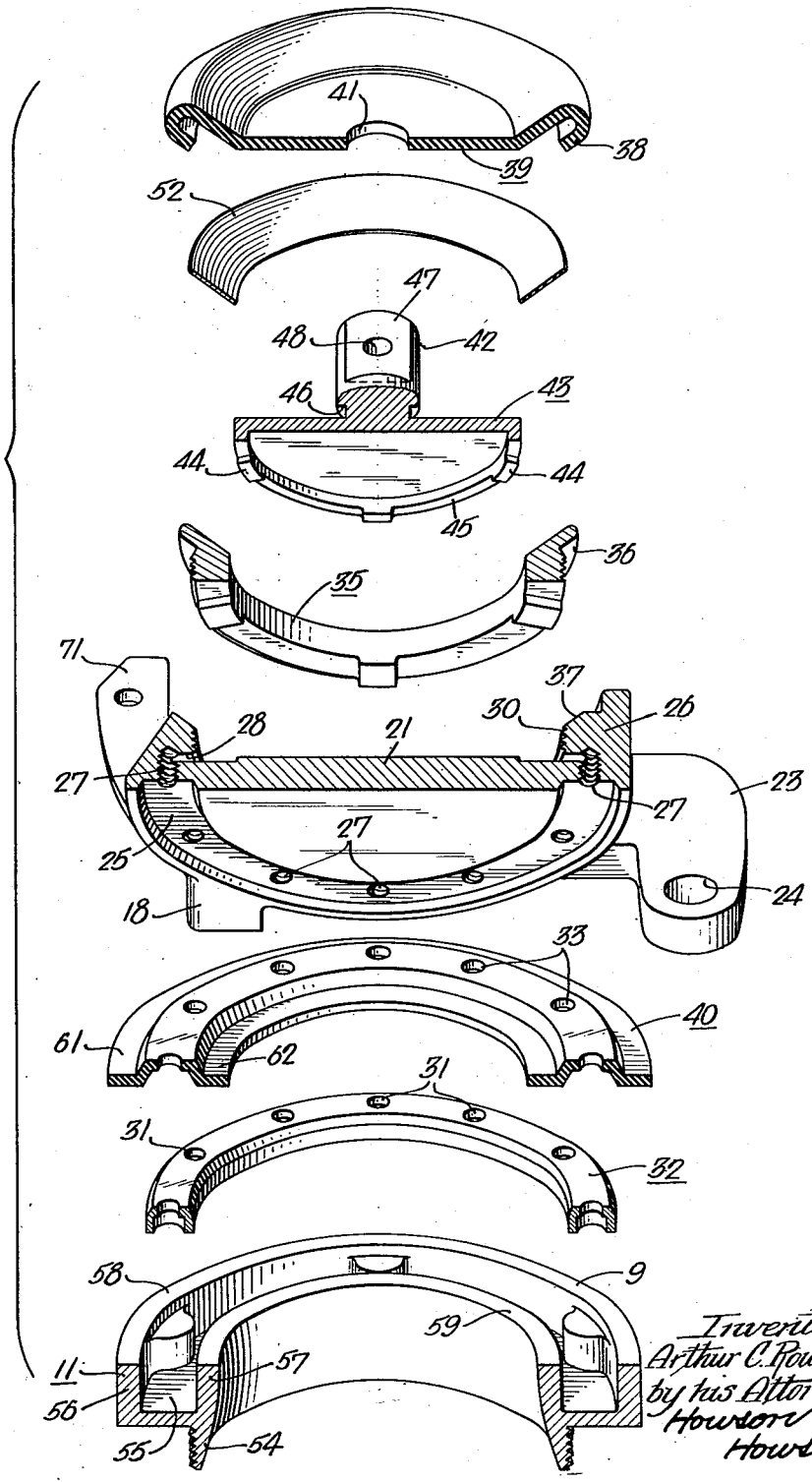

Patented Feb. 2, 1954

2,667,934

UNITED STATES PATENT OFFICE 2,667,934

DRY PIPE VALVE

Arthur C. Rowley, Drexel Hill, Pa., assignor to Globe Automatic Sprinkler Company of Pennsylvania, Philadelphia, Pa., a corporation of Pennsylvania Application December 28, 1951, Serial No. 263,880

1 Claim. (Cl. 169—20)

This invention relates to improvements in valves for dry pipe sprinkler systems, and a primary object of the invention is to provide a relatively simple compact and highly efficient valve of this type.

Another object of the invention is to provide a valve of the stated type wherein the latching means for the valve constitutes a built-in part of the structure of the valve clapper.

Another object of the invention is to provide a valve of the stated type including improved means for resetting the valve in operative condition after actuation.

The invention includes also certain novel structural and mechanical details and arrangements hereinafter described and illustrated in the attached drawings wherein:

Figure 3 is an enlarged fragmentary sectional view of the valve clapper shown in Figure 1 and illustrates certain details of construction not clearly illustrated in the latter figure;

Figure 4 is a fragmentary sectional view on the line 4—4, Figure 3;

Figure 5 is a sectional view on the line 5—5, Figure 2;

Figure 7 is an exploded vertical sectional view of the valve clapper showing the forms of the several component elements;

Figure 8 is a front elevational view of the dry pipe valve as installed in a dry pipe system including the auxiliary equipment; and Figure 9 is a side elevational view of the assembly illustrated in Figure 8.

Figure 1:
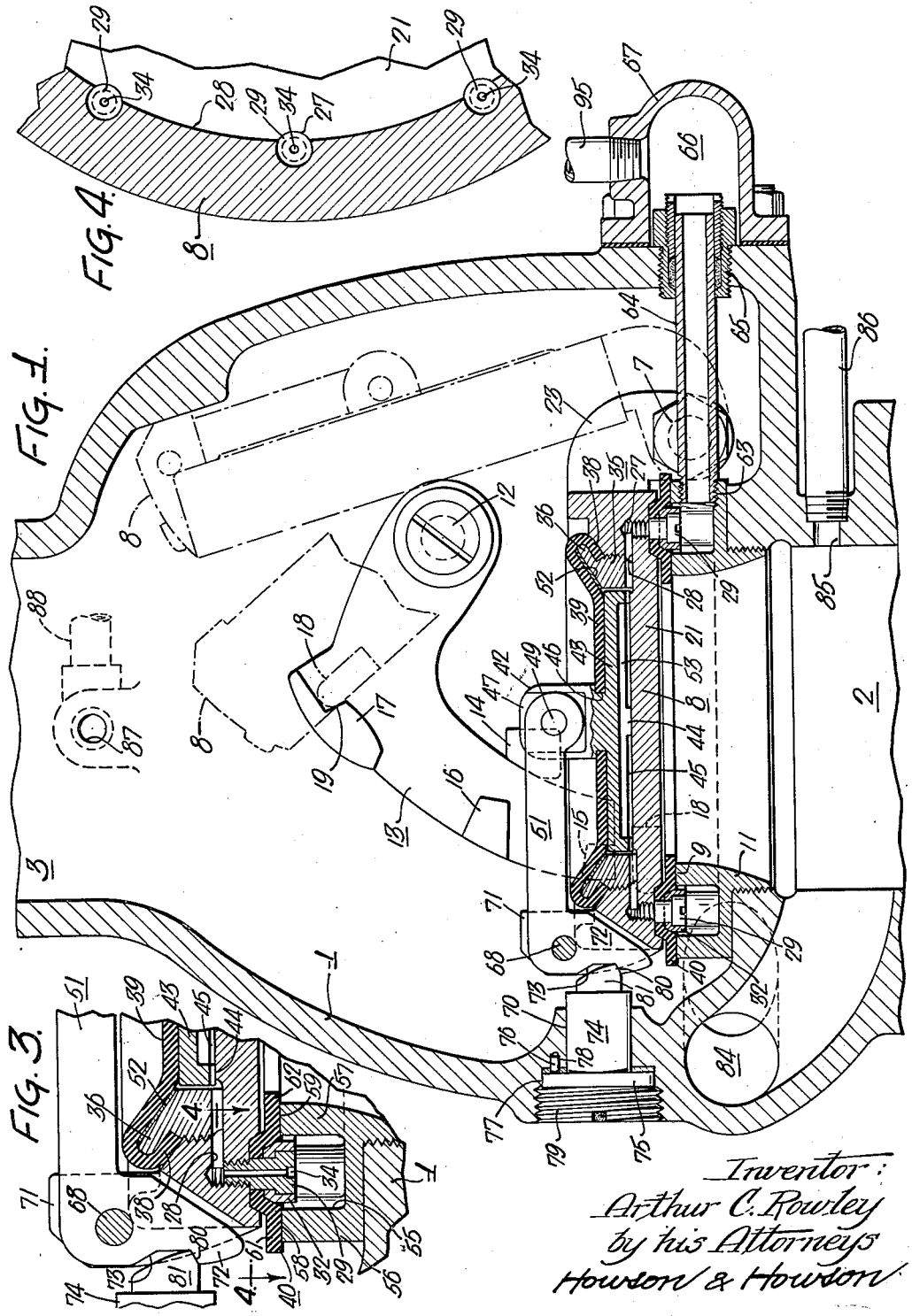
Figure 1 is a fragmentary vertical sectional view of a dry pipe valve made in accordance with my invention.
Figure 2:
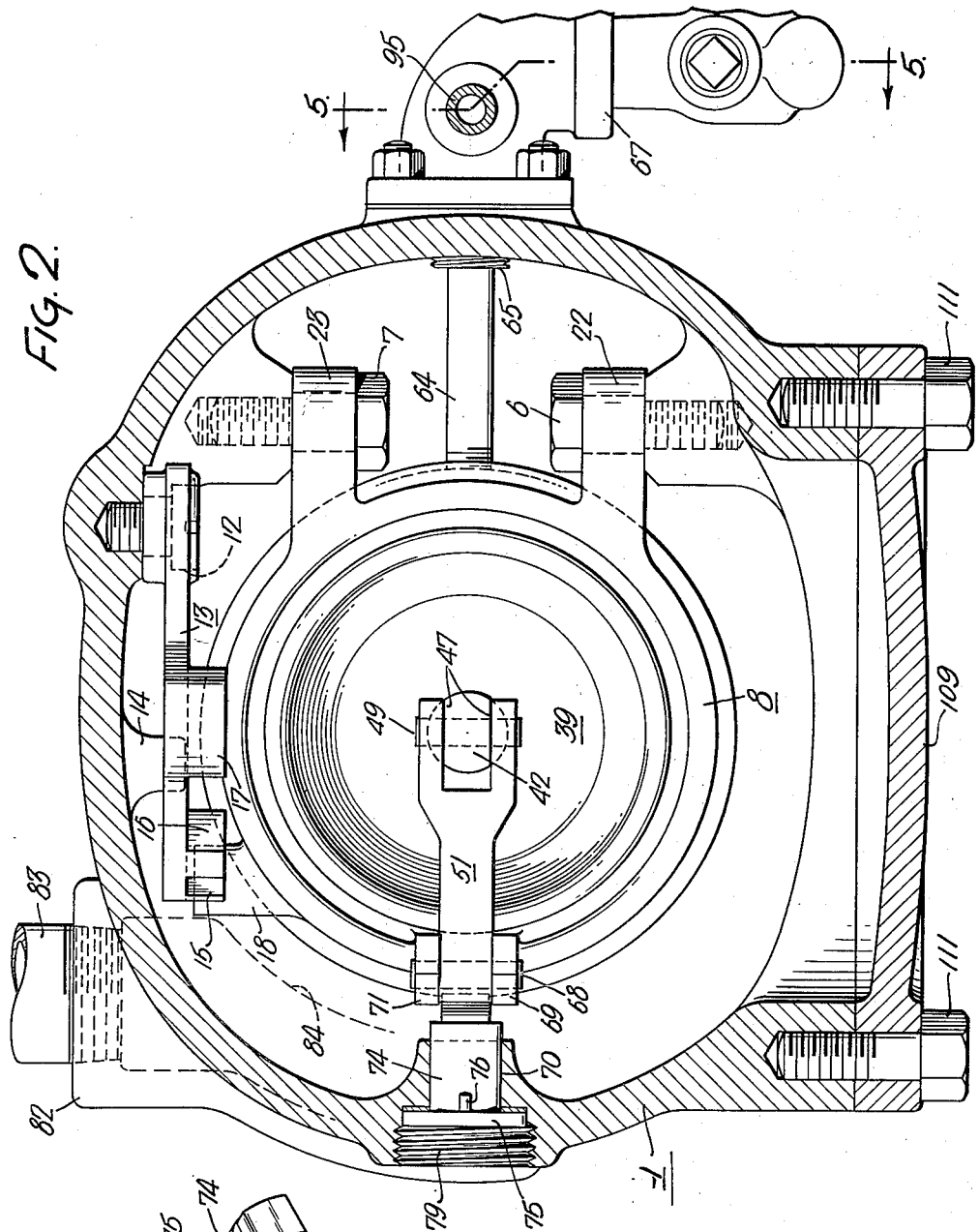
Figure 2 is a horizontal sectional view of the valve.

With reference to Figures 1 and 2 of the drawings the dry pipe valve forming the illustrated embodiment of my invention comprises the usual casing 1 having an inlet port 2 and a discharge port 3. As illustrated in Figure 7, the port 2 is adapted for connection to a suitable water main 4; and the port 2 connects to the dry pipe system which is indicated by the reference numeral 5.

Mounted within the casing 1 upon pivot screws 6 and 7 is a valve clapper 8 which is arranged to cooperate with a seat 9 to separate the port 2 from the port 3. In the present instance the seat 8 is formed on a bushing 11 which is threaded into the casing 1, as best illustrated in Figure 1. The pivot 6—7 is located to one side of the bushing 11 so that the clapper may move about the pivot between the seated position, indicated in full lines in Figures 1 and 2, and an elevated or retracted position which is indicated in broken lines. In the latter position the clapper leaves the opening through the bushing 11 in substantially unobstructed condition so that the water discharging from the main may pass directly to the dry pipe system 5.

Pivotally mounted at 12 on the inner wall of the casing 1 is an arm 13 which normally rests upon a lug 14 extending inwardly from the inner face of the casing wall. The arm 13 is substantially L-shaped and when seated upon the lug 14 will occupy the position in which it is shown in Figure 1. It will be apparent that gravity tends to retain the arm in this position. The arm 13 has three lugs 15, 16, 17 projecting from the inner face thereof toward the clapper 8. These lugs are arranged in series longitudinally of the arm 13 and project into the path of a lug 18 on the clapper 8 in its movement with the clapper between the seated and retracted positions mentioned above. When the clapper is seated the lug 18 will underlie the lug 15 and when the clapper is elevated it will engage the lug 15 and will elevate the arm 13 about its pivot 12. The lug 18 will follow an arc centered in the common axis of the screws 6 and 7, whereas the lug 15 will travel in a different arc centered in the pivot 12 so that after a given upward movement of these parts the lug 18 will clear the inner side of the lug 15 and will then permit the arm 16 to fall by gravity until interrupted by engagement of the lug 16 with the lug 18. Continued elevation of the clapper will continue the elevation of the arm 13 until such time as the lug 18 clears the inner end of the lug 16 when the arm 13 will again drop until the lug 17 engages the lug 18 of the clapper. Continued elevation of the clapper will eventually carry the lug 18 clear of the lug 17 thereby permitting the arm 13 to assume its normal position supported by the fixed lug 14 of the casing, leaving the clapper 8 free to assume its extreme elevated position as indicated in broken lines in Figure 1. It will be noted by further reference to Figure 1, however, that the lug 17 while permitting passage of the lug 18 in the upward movement of the clapper, is shaped so that when the arm 13 is in the normal position the lug 17 will present a shoulder 19 to the lug 18 which acts as a stop for the clapper when the latter moves toward the seating position as illustrated in broken lines in Figure 1. The stops 15 and 16 will function in like manner to prevent return of the clapper to its seat from intermediate positions of clapper retraction.

The structural form of the clapper 8 is illustrated in Figures 1 to 4 and 7. The clapper comprises a metallic or other rigid disc-like body 21 from one side of which project the ears 22 and 23 which are apertured for reception of the pivot screws 6 and 7 (see Figure 2). In Figure 7 the aperture in the ear 23 is indicated by the reference numeral 24. At the underside of the body 21 and adjoining the periphery of the body is a circular groove or recess 25, and at the top of the disc is a peripheral flange 26 which is internally threaded at 30 for a purpose hereinafter described. The flange 26 is undercut from the inner side by a groove 28 and a series of tapped holes 27 is provided in the bottom of the groove 25, which holes intersect the undercut groove 28, as best illustrated in Figures 3 and 7. A rubber or other gasket 40, the form of which is illustrated in Figures 3 and 7, is seated in the annular recess 25 and is held in place by screws 29 which pass through apertures 31 in a washer retaining ring 32, through apertures 33 in the gasket 40 and into the tapped holes 27 of the clapper body. As shown in Figure 3, the screws 29 are provided with longitudinal central bores 34 which at the inner ends of the screws are in communication with the undercut recess 28.

Threaded into the top of the body of the clapper 8 by way of the threads 30 is a bushing 35 having at the top thereof an outwardly projecting flange 36 which coacts with an opposed parallel surface 37 of the clapper body to provide a clamp for the turned-under peripheral edge 38 of a rubber or other flexible diaphragm 39. The disc 39 is provided with a central aperture 41 which receives an upwardly projecting stem 42 on a disc 43 which immediately underlies the diaphragm as best shown in Figure 1 and which normally seats upon the top surface of the body of the clapper. It will be noted that the member 43 is provided at its underside with a peripheral series of depending lugs 44 which normally seat upon the upper confronting surface of the body member of the clapper and which provide a number of slots 45 which establish communication between the undercut recess 28 and the underside of the member 43. The portions of the diaphragm 39 which edge the central aperture 41 are closely confined in an undercut circumferential recess 46 at the base of the upwardly extending stem 42 of the disc 43, and the stem 42 is provided with flat side surfaces 47, 47 and with a transverse aperture 48 which extends between the said surfaces. This aperture receives a pin 49 the projecting ends of which form a pivotal support for the bifurcated end of a lever arm 51 the function of which will be hereinafter described. It will be noted further that a separator strip 52 is provided between the underside of the diaphragm and the confronting conical surface of the bushing 35, the separator strip being cone-shaped to conform to the said surface of the bushing and of the confronting inclined surface of the diaphragm.

It will now be apparent that the clapper structure includes not only the aforesaid body member but also the diaphragm 39 with its associated disc member 43 which form between the underside of the said member 43 and the upper surface of the clapper body a chamber designated in Figure 3 by the reference numeral 53 which is sealed except for its communication through the slots 45 and the undercut recess 28 with the bores 34 of the screws 29.

The bushing 11 which forms the seat for the clapper 8 as previously described is best illustrated in Figures 3 and 7. It comprises a depending externally threaded flange 54 by way of which it is threaded into the upper end of the port 2 of the valve casing 1. At the top the bushing is provided with a circumferential channel 55 defined by upwardly extending spaced walls 56 and 57. The upper surfaces 58 and 59 of these walls forms concentric relatively spaced seats for the gasket 40, the outer and inner peripheral flanges 61 and 62 of this gasket being arranged for seating engagement with the said surfaces 58 and 59 as best illustrated in Figure 3. As illustrated, the heads of the screws 29 and the gasket retaining ring 32 project downwardly into the top of the channel 25 when the clapper is seated on the bushing and under these circumstances the lower and outer ends of the bores 34 of the screws communicate with the said channel. As shown in Figure 1, the outer wall 56 of the bushing is provided with a tapped hole 63 which receives one end of a tube 64 which extends outwardly through a suitably sealed opening 65 in the side of the valve casing 1 and into an interior chamber 66 of a fitting 67 which is secured to the side of the casing 1 and which functions for the purpose hereinafter described.

Figure 6:
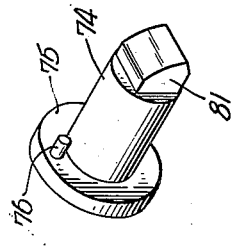
Figure 6 is a view in perspective of the clapper retaining element.

The arm 51 which as previously described, is pivotally atached to the stem 42 of the diaphragm assembly 39—43 extends radially to the peripheral edge of the clapper and at the end is pivotally connected by a pin 68 to and between a pair of upstanding lugs 69 and 71, as best shown in Figure 2. The outer extremity of the arm 51 extends downwardly as indicated at 72 in Figure 1 and this depending end portion is recessed at its outer surface as shown at 73. When the clapper is seated and the diaphragm is depressed, as in Figure 1, this recess 73 is positioned to receive the inner projecting end of a detent plug 74 which is mounted in an aperture 70 in the wall of the casing 1. As shown in Figures 1, 2 and 6, the plug 74 has a disc 75 at its outer end from the inner face of which projects a small locking pin 76. In assembly the disc 75 seats within a countersunk recess 77 at the outer end of the plug opening 70, and the pin 76 enters and closely fits a cylindrical recess 78 in the casing to thereby secure the pin 74 in a predetermined position and to maintain it in this position. The plug 74 is held in place by a threaded locking plug 79 which is threaded into the outer end of the countersunk opening 77. The inner extremity 81 of the detent plug 74 is shaped to enter the recess 73 of the lever extension 72 and to cooperate with the slightly inclined bottom surface 80 of the recess 73, as best shown in Figures 1 and 3, to lock the clapper in the seated position.

It will be noted that the effectiveness of the detent to lock the clapper on its seat depends upon the position of the diaphragm 39 and of its associated member 43. Thus when the member 43 is seated on the body of the clapper, as shown in Figure 1 the depending end 72 of the lever 51 will be held in an advanced position with respect to the detent plug 74; and when the diaphragm 39 and the member 43 are elevated from this normal position an angular movement of the lever 51 about the pin 68 in a counterclockwise direction will have occurred with resulting retraction of the depending end portion 72 of the lever from the detent plug 74 and release of the lever from the detent. When this occurs the clapper is free to move upwardly from its seat.

With reference to Figures 1 and 2 it will be noted that the wall of the casing 1 is provided in the lower part thereof with a projecting boss 82 having a threaded opening at its outer end for reception of the correspondingly threaded end of a pipe 83, see Figure 2. The hollow interior of the boss 82 communicates with a passage 84 which extends to the intake port 2 of the casing. The casing is also provided below the valve seat bushing 11 with a port 85 in the outer end of which is threaded a pipe 86. In the upper part of the casing is a third port 87 from which extends a pipe 88; and a fourth port (not shown) is provided in the casing above the clapper seat bushing 11 from which extends a pipe 89 shown in Figure 8. The function of these several ports will be described hereinafter.

The fitting 67 is best illustrated in Figure 5. As previously set forth, this fitting contains a chamber 66 with which the outer end of the pipe 64 communicates and which communicates in turn with an overflow chamber 91 having a discharge port 92 passing to atmosphere. The port 92 is controlled by a clapper valve 93 in the interior of the fitting which in a normal gravity assumed position shown in full lines in Figure 5, leaves the port substantially unobstructed, and which is adapted under certain conditions to assume an elevated position shown in broken lines to thereby close the port 92. Where the flow of liquid through the fitting to the discharge port is slow, as might occur for example in minor leakage past the gasket 28 of the clapper into the channel 55 of the bushing 11, the valve 93 will maintain its normal retracted position, but if a solid stream of liquid passes through the pipe 64 to the fitting 67 and moves to the discharge port 92 the force of its flow will be sufficient to move the valve 93 upwardly to the port sealing position thereby preventing escape of the liquid from the chamber 66 of the fitting by way of the overflow port. The fitting 67 has a port 94 in its top in which is secured one end of a pipe 95 which extends upwardly to a suitable alarm system (not shown), this pipe containing a check valve 96. A branch pipe 97 from the pipe 95 extends upwardly to an accelerator unit 98, this unit being operatively connected also with upper part of the casing 1 through the pipe 88 which extends to the port 87 previously referred to. It will be noted by reference to Figures 8 and 9 that the pipe 88 contains a control valve 99 located between the accelerator 98 and the port 87.

The pipe 83 extends transversely from the boss 82 of the casing 1 and downwardly as shown in Figures 8 and 9 to a suitable drain, and this pipe contains a valve 101 by means of which the pipe can be closed or opened as required. A branch pipe 102 from the pipe 83 extends to the bottom of a funnel 103 the open top of which underlies the discharge port 92 of the fitting 67. The pipe 102 contains a check valve 104 which prevents discharge through this pipe from the drain pipe 83 while permitting flow through the pipe 102 from the funnel 103 to the drain.

The pipe 86 extends away from the port 85 and upwardly to a port in the upper part of the casing. This pipe contains two valves 105 and 106 and from a point between these valves a branch pipe 107 extends from the pipe 86 to a point above the drain funnel 103. By reason of the valves 105 and 106 the drain pipe 107 may be segregated from either one or both of the upper and lower portions of the pipe 86 which connect respectively to the top and bottom of the casing 1.

A valve 108 is interposed between the inlet port 2 of the casing 1 and the pressure main 4 (see Figure 8) so that the valve casing may be shut off from the main as required by the operations hereinafter described. It will be noted also that the casing 1 is provided at one side with a cover plate 109 which is secured in place by screws 111 and which may be removed to afford access to the interior of the casing 1.

In normal operation of the dry pipe valve the clapper 8 will occupy its seat as shown in Figure 1. The clapper will be exposed at the underside to the pressure in the water main 4. The upper face of the clapper will be exposed to the pressure of the air with which the dry pipe system is charged in accordance with the conventional practice and this pressure will be in excess of atmospheric. In accordance with the usual practice also, the lower portion of the upper chamber of the casing 1 will contain water to sufficient depth to cover the valve seat. The latching elements will be in the positions in which they are shown in Figure 1 wherein the diaphragm 39 is depressed and the lugs 44 are seated upon the upper surface of the disc-like body portion of the clapper 8. The diaphragm and disc 43 are held in this position by the fluid pressure in the dry pipe system, this by reason of the fact that the chamber 53 at the underside of the diaphragm and disc is connected through the recess 28, and bores 34 of screws 29 with the channel 55 of the bushing 11 which as previously described is connected by way of the pipe 64 and fittings 67 with the discharge port 92 opening to atmosphere. It is evident that the pressure in the main 4 will tend to force the clapper 8 upwardly from its seat and that this unseating force will tend also to cause the lever 51 by reason of the engagement of the depending end portion 72 of this lever with the detent 74 to turn counterclockwise about the pivot pin 68 so as to elevate the disc 43 and the diaphragm 39. The pressure in the dry pipe system must be sufficiently in excess of atmosphere that, acting upon the upper surface of the diaphragm, it will offset the unseating force of the water pressure exerted on the underside of the clapper.

It will be apparent that any leakage of water past the gasket 28 from either side of the valve will enter the channel 55 and will pass by gravity through the pipe 64 and fitting 67 to the drain port 92 from this port to the drain funnel 103. Such leakage being necessarily small under normal conditions would have no effect upon the valve 93 of the fitting 67 which remains open.

Under these conditions also the valve 99 connecting the accelerator 98 with the casing 1 will be open. The valve 101 which connects the drain pipe 83 with the lower part of the casing will be closed, as also will the valves 105 and 106. The valve 90 which controls the drain pipe 89 is also closed, it being noted that the depending discharge end of the pipe 89 overlies the drain funnel 103.

Assuming now that one or more of the sprinklers in the dry pipe system are released in response to abnormal temperatures to which they may be exposed, the air pressure in the dry pipe system will begin to fall by reason of the resulting leakage. A sufficient drop in the fluid pressure exerted on the top of the diaphragm 39 will permit the pressure of the water at the inlet port 2 of the valve casing and in the main 4 to force the clapper 8 upwardly from its seat, this being accompanied by a counterclockwise angular movement of the lever 51 about the pin 68, as previously explained, thereby retracting the depending end 72 of the lever from the terminal end 81 of the detent plug 74. The initial unseating of the valve 8 will admit water from the main to the channel 55 of the valve seat bushing 11 and thence through the pipe 64 to the interior of the fitting 67. This volume flow of water to the drain port 92 of the fitting will cause the valve 93 to elevate and close the drain port so that the water accumulating in the fitting 67 will flow upwardly through the pipe 95 to the alarm device with which that pipe is connected. The accelerator, the details of which form no part of the present invention, may be of the general character of that disclosed in U. S. Patent No. 1,913,245, issued in 1933, and will function in well-known manner to bleed the air pressure from the dry pipe system rapidly by way of the port 87 and pipe 97 so as to rapidly reduce the air pressure in the system to thereby accelerate the opening movement of the clapper 8 under the unbalanced pressure in the water main. Any surges in the system tending to reseat the clapper 8 before it is fully opened will be prevented by interaction of the lug 18 of the clapper structure with the lugs 15, 16 and 17 of the lever 13 as previously described. Water from the main now passes freely to and through the sprinkler system.

When it is desired to reseat the valve and the apparatus after restoring the sprinkler system by replacement of the open sprinkler heads, the valve 108 having previously been closed to disconnect the main 4 from the system, the initial step is that of draining the sprinkler system free of contained water. This is accomplished by opening the valve 101 which permits the water to pass from the system through the passage 84 and drain pipe 83. In this operation the clapper 8 is maintained in the elevated position by engagement of the lug 18 with the shoulder 19 of the lug 17. Water will drain from the alarm system through a small orifice in the valve seat of valve 96 provided for that purpose; and water will also drain from the water side of the accelerator 98 through pipe 97 and fitting 67. The cover plate 109 may now be removed from the casing 1 and the lever 13 elevated to release the clapper 8, permitting this clapper to return to its seat. The valve 101 will then be closed and the dry pipe system charged with pressure air in accordance with the usual practice, after which the valve 108 may be reopened to connect the casing 1 with the water main 4.

I claim:

In a valve of the character described, a casing having inlet and outlet ports, a valve seat intermediate the ports, a valve element having a body portion coactive with the seat to separate the ports, said seat confronting the said discharge port so that fluid pressure at the inlet port will tend to unseat the valve element, a chamber in the valve seat opening toward the discharge port and sealed by the valve element from both of said ports when the said element is seated, a duct extending from the chamber to the exterior of the casing, a member supported solely by said body portion and constituting a relatively moveable part of the valve element, flexible means connecting the member with the said body portion and sealing the joint between the member and the body portion so as to form with the latter a chamber within the valve element, said flexible means being exposed to fluid pressure at the discharge side of the valve, channel means in said body portion for establishing communication between the last named chamber and the chamber in the valve seat when the valve element is seated, a relatively fixed detent on the casing, a latch member pivotally mounted on the body portion of the valve element for interlocking engagement in an advanced position with the detent to retain the valve on its seat, said member being pivotally retractable for disengagement from the detent, and said latch member being connected to the said relatively moveable member of the valve element and being held by the latter in the said advanced position when the said member and flexible means are under fluid pressure in the discharge side only of the valve casing as when the valve element is seated, and said detent constituting a fulcrum for retractive movement of the latch member about its pivot resulting from displacement of the valve element from its seat by unbalanced fluid pressures in the intake side of the valve casing.

ARTHUR C. ROWLEY.

References Cited in the file of this patent

UNITED STATES PATENTS

| Number | Name | Date |
|---|---|---|
| 1,763,834 | Tyden | June 17, 1930 |
| 1,866,766 | Griffith | July 12, 1932 |